United States Patent Office 2,945,539
Patented July 19, 1960

---

2,945,539

CEMENTING COMPOSITION AND METHOD OF USE

Louis H. Eilers, Tulsa, Okla., assignor to The Dow Chemical Company, Midland, Mich., a corporation of Delaware No Drawing. Filed July 31, 1958, Ser. No. 752,197

4 Claims. (Cl. 166—33)

The invention concerns cementing operations generally and concerns more particularly a gel cement composition and method of use therefor in cementing wells. Fluids contained in a subterranean formation, having high value to the well-being and the economic progress of the people of the world, are usually made accessible by means of a well traversing the fluid-bearing formation. Many problems must be overcome before a well is sunk into such a fluid-bearing formation and put into successful operation for the production of the fluid therefrom. Among such problems, following the location of a fluid-bearing formation and in conjunction with the actual drilling of a hole therein are: the installation and firmly affixing of casing in the well to prevent sloughing of the wellbore wall which otherwise blocks up the wellbore and the sealing off of zones through which the wellbore passes which yield unwanted fluids which contaminate the fluids sought to be produced. Widespread practice in the sinking of wells and particularly in the drilling of oil and gas wells and maintaining them in a satisfactorily producing status is to make a neat cement slurry (Portland cement and water) and force it down into the well to the base of the casing and usually upwardly therefrom to fill in the space between the casing and the wellbore wall to firmly hold the casing in position and to seal off zones producing unwanted fluids in communication with the wellbore, as by squeeze-cementing operations.

Slurries consisting of Portland cement and water to seal off troublesome zones and secure well casing in position, although widely used, are inherently deficient in certain properties, that is, are lacking such properties which are desirable in a well cementing composition. Among the properties which a slurry of hydraulic cement and water lack are: ability to bond to the earthen wall of the hole; compatibility with brine or any residual drilling mud in the wellbore or in the zone to be cemented off; resistance to loss of water into the formation when the slurry is subjected to the pressure necessary to force it into place thereby causing an undue amount of water to move into the formation and making the positioning of the cement slurry extremely difficult because of its tendency to set up due to the lack of water. Furthermore, neat cement slurries when set lack shatter resistance when perforations are attempted through such set cement.

These and other deficiencies of a Portland cement slurry have given rise to a need for better cementing materials and methods of sealing off wells. To meet this need slurries have been made consisting of an hydraulic cement, e.g., Portland cement, and an oil such as crude oil or other mineral oil. Portland cement has also been mixed with polymers such as those described in U.S. Patent 2,819,239, and with polyvinylacetate as described in our copending application Ser. No. 750,629, filed July 24, 1958. A further attempt to provide an improved cementing composition for cementing off wells has given rise to the development of a Portland cement-bentonite aqueous slurry referred to generally as a gel cement. The gel cement offers certain advantages over theretofore known cementing compositions. Among such advantages are lower density, lower fluid loss therefrom and less likelihood of difficulty in getting the cement slurry into position, a greater toleration for contaminants such as drilling mud, greater shatterproof properties thereby permitting perforations without destruction of the cement exterior to the casing, and a cementing composition of less initial cost than neat cement slurries but which nevertheless is sufficiently durable and possesses sufficiently high compression strength to satisfy the needs for a great number of cementing operations including the cementing off of oil wells.

Despite the number of advantages which the gel cements offer over cements theretofore known, a particular disadvantage has been associated with the use of such gel cements, viz., the high viscosity of such slurries making the handling of them a particularly difficult operation. Numerous attempts have been made to reduce the viscosity of such gel cements. One attempt which has shown some degree of success is the use of calcium lignosulfonate therein. The calcium lignosulfonate, however, has caused a retardation of the setting of the cement.

A need, therefore, exists in cementing operations and particularly in cementing off of oil wells and positioning casings in oil wells, which offers all the advantages of known gel cement compositions but in addition thereto provides good viscosity control.

Consequently, the principal object of the invention is to provide a gel cement having improved viscosity control without undesirable effects on the setting time of the cement. The attainment of this and related objects will be made clear as the invention is described and is particularly defined in the appended claims.

The invention consists of a cementing composition composed of hydraulic cement, bentonite, water and gum accroides (or accroides gum) and the method of cementing wells employing the composition.

Any hydraulic cement may be used in the practice of the invention. By hydraulic cement is means what is ordinarily referred to as Portland cement and to aluminous cement. For example, the cement described as Types I through V, ASTM Standards (1952), Part 3, designated C150-52, pages 1-5, may be used.

Bentonite, useful in the practice of the invention, is a fine-grained clay often composed largely of volcanic ash which may have been blown from considerable distance from the origin thereof and may even have been deposited in waters and gradually settled to the bottom thereof and was later exposed through geologic changes. It is often referred to as sodium montmorillonite. For the purposes of the invention, however, the term bentonite herein includes what is usually referred to as montmorillonite, a clay which consists largely of the chemically combined oxides of magnesium, calcium, aluminum and silicon together with some water of hydration. A large producing area of bentonite useful in the practice of the invention is the State of Wyoming.

The accroides gum useful in the practice of the invention are sometimes referred to as acaroid resins. Accroides gum in commerce is sometimes referred to as a Botany Bay gum, yacca gum, grasstree gum, earth shellac, and yellow resin. Accroides gum is obtained from the *xanthorrhoea* species, natural order of Juncaceae, which grows in Australia and Tasmania. There are two major varieties of accroides, namely the yellow accroides, which is relatively scarce, and the red accroides which is relatively plentiful in those areas. A marketable accroides gum is formed by the exuding of a natural resin at the base of the old leaves by the leaves themselves, the exuded resin then lying in a thick jacket around the trunk of the tree. The leaf of the tree has about a three-inch stiff base about which the resin collects. The resin usually congeals into a thick solid mass. It is usually obtained by heating the trunk of the tree which causes the resin to loosen; it is thereafter collected, largely as a powder, melted down and usually at least partially refined. The red accroides is often referred to as Black Boy gum because of its extremely dark color and also as a grasstree gum. Gum accroides useful in the practice of the invention preferably contains less than 10 percent material insoluble in alcohols such as methyl, ethyl, octyl or benzyl, although up to 13–15 percent can be tolerated, and less than 5 percent of ash. Both the yellow and red varieties of accroides gum are available in commerce. They contain from 80 to 85 percent resinotannols (erythroresinotannol, $C_{40}H_{39}O_9OH$, in the red variety and xanthoresinotannol, $C_{43}H_{45}O_9OH$, in the yellow variety). The balance of the yellow accroides is made up largely of coumaric acid, cinnamic acid, styracin and oxybenzaldehyde. The red variety usually contains a slightly higher percent of resinotannol and does not contain any appreciable amount of cinnamic acid. The following table sets out values typical of commercial accroides gum:

Specific gravity____ 1.34.
Melting point_____ 97° C. for the yellow variety; 110–120° F. for the red variety.
Acid value_____ 128.
Iodine value_____ 200.
Moisture_____ 3.0 to 3.5.
Ash_____ 1.3 to 4.0.

The proportion of the ingredients of the composition of the invention is 100 pounds of hydraulic cement to between 8 and 25 pounds of bentonite and between 0.1 and 1.0 pound of accroides gum, and sufficient water to make a pumpable slurry. The preferred limits of the accroides gum are 0.2 to 0.5 percent based upon the weight of the Portland cement.

In practicing the invention, the bentonite is usually blended with the dry hydraulic cement at any convenient time prior to its use. This may be done in a bulk cement plant or may be done when the cement is being transferred from railroad cars to bulk storage or just prior to making up the aqueous slurry for immediate use. The gum accroides is preferably added also to the dry cement-bentonite mix and may be added during the bentonite mixing operation. The mixing may be accomplished by any known means of mixing dry ingredients as, for example, by mixing in a tank equipped with a power driven central axle to which are attached paddles radiating outwardly from the axle. To the dry mixture is then added sufficient water to result in an easily handled flowable slurry. The mixing of the water into the dry mixture may be facilitated by causing the water under pressure to impinge upon the mixture from an aperture or by recirculating the insufficiently homogeneous mixture or passing it through a colloid mill. However, an impeller type mixer, of which that known as the Lightnin-Mixer is an example, is satisfactory for mixing the slurry. The gel cement slurry containing the accroides gum is now ready for pumping down the well and positioning therein at the place where the cementing off operation is desired. The pumping of the cement into the well is accomplished by known methods of cementing employing conventional well-cementing apparatus.

To show the effect on the viscosity and initial set of Portland cement-bentonite aqueous slurries by admixing therewith gum accroides according to the invention, the tests set forth in the table were run in which both the amounts of the bentonite and the gum accroides were varied, yellow accroides being used in all the tests except Test 9 in which red accroides was used. In these tests, 94 parts by weight (1 sack) of Portland cement Type I were admixed with the weight of bentonite and gum accroides, if any, set out in the table. To the dry mixture thus prepared were admixed 90 parts by weight of water.

TABLE

| Test | Parts by Wt. of Bentonite per 94 Parts of Cement | Parts by Wt. Gum Accroides per 94 Parts of Cement | Viscosity in cps. | Initial Setting Time in Hrs. at 150° F. |
|---|---|---|---|---|
| 1 | 3.7 | None | 38 | 1 |
| 2 | 3.7 | 0.25 | 28 | 1.5 |
| 3 | 7.5 | None | 110 | 1.25 |
| 4 | 7.5 | 0.25 | 85 | 1.5 |
| 5 | 11.3 | None | 325 | 1.0 |
| 6 | 11.3 | 0.125 | 248 | 3.0 |
| 7 | 11.3 | 0.25 | 198 | 4.0 |
| 8 | 11.3 | 0.50 | 103 | 6.0 |
| 9 | 11.3 | 0.50 | 100 | 6.0 |
| 10 | 11.3 | 1.00 | 80 | 9.0 |
| 11 | 15.0 | None | 495 | 2 |
| 12 | 15.0 | 0.25 | 335 | 3 |
| 13 | 15.0 | 1.0 | 210 | 4.5 |
| 14 | 18.8 | None | 725 | 3 |
| 15 | 18.8 | 0.25 | 630 | 3.5 |
| 16 | 18.8 | 1.0 | 485 | 6 |
| 17 | 23.5 | None | 1,020 | 5 |
| 18 | 23.5 | 0.25 | 875 | 6 |
| 19 | 23.5 | 1.0 | 535 | 9 |

An examination of the table shows that there was a marked reduction in the viscosity when the gum accroides was added which reduction became more pronounced as the gum was increased from 0.125 part by weight to 1 part by weight. It also shows that although there was an increase in the setting time at 150° F., the increase was not of such magnitude as to interfere with the practice of the invention.

A further examination of the results of the table shows that when bentonite is present in an amount in excess of 7.5 parts by weight of Portland cement, admixing of from 0.25 to 1.0 part of gum accroides produced a marked reduction in the viscosity. An improvement in decreased viscosity is apparent when bentonite is present in amounts less than 7.5 parts, but at these lower bentonite concentrations, high viscosity is not a serious problem.

The following example illustrates the practice of the invention.

*Example*

To a 1000-gallon mixing tank equipped with a stirring mechanism consisting of a motor driven central axle to which were attached radiating paddles were added 676.8 pounds of bentonite (6.77 sacks), 5640 pounds of Type I Portland cement (60 sacks), and 28.2 pounds of gum accroides of the red variety. The bentonite made up 12 parts by weight of the Portland cement. This amount of gum accroides was 0.5 percent by weight of the dry Portland cement or about 0.446 percent of the combined weight of the Portland cement and bentonite. The dry ingredients were then thoroughly mixed. To the dry mixture were added 747.6 gallons of water and the aqueous mixture thoroughly stirred until it was substantially uniform. A thousand gallons of slurry were thus made having a density of 12.6 pounds per gallon. The slurry was found to be exceedingly smooth and fluid in comparison to similar gel cement slurries which did not contain the accroides gum. The cement composition thus made was then pumped into a well following a conventional cementing procedure.

The composition of the invention when used to cement off zones yielding contaminating fluids in a well or to secure a casing in position provide a number of advantages among which are: a stable uniform slurry is produced having a lower density than neat cement slurries commonly used; bentonite is used which is considerably cheaper than cement and therefore provides a composition which is more economical than neat cement commonly used; a composition is provided which tolerates up to 20 percent of drilling mud or loosened material from the wellbore or sides of the formation without serious consequences on the ultimate strength of the cement composition; the water lost by filtration into the formation while positioning the composition employed in the well is definitely lower than that which accompanies the placing of neat cement into position, being in the neighborhood of only 50 percent as much water loss; the composition of the invention may be used in wells having bottom hole temperatures as high as 275° F.; the composition of the invention when set is highly resistant to sulfates and other contaminating salts contained in the fluids contacting the cement in position; casings and the composition of the invention, when set about the outside of the casing, can be perforated without resulting shatter damage to the cement composition; and the composition possesses a lower viscosity without adverse effect upon the setting time of the cement and, therefore, provides a more fluid composition than any gel cement composition heretofore known.

Having described the invention, what is claimed and desired to be protected by Letters Patent is:

1. A gel cement composition for admixture with water consisting by dry weight of an admixture of 100 parts of an hydraulic cement selected from the class consisting of aluminous and Portland cement, between 8 and 25 parts of bentonite, and between 0.1 and 1.0 parts of accroides gum.

2. An aqueous gel cement composition consisting of (1) 100 parts by weight of an hydraulic cement selected from the class consisting of aluminous and Portland cement, between 8 and 25 parts by weight of bentonite, and between 0.1 and 1.0 part by weight of accroides gum, and (2) sufficient water to make a pumpable slurry.

3. The method of cementing off a zone in a subterranean formation traversed by a well consisting of injecting down the well and positioning therein a gel cementing aqueous slurry consisting of 100 parts by weight of an hydraulic cement selected from the class consisting of aluminous and Portland cement, between 8 and 25 parts of bentonite and between 0.1 and 1.0 part of accroides gum (calculated on a dry weight basis), and sufficient water admixed therewith to make a pumpable slurry.

4. The method of claim 3, wherein the percent of accroides gum is between 0.2 and 0.5 part by dry weight based upon 100 parts of said hydraulic cement.

References Cited in the file of this patent
UNITED STATES PATENTS

| | | |
|---|---|---|
| 2,348,484 | Lawton | May 9, 1944 |
| 2,526,674 | Larsen | Oct. 24, 1950 |